US012639208B2

(12) United States Patent
Palmer

(10) Patent No.: US 12,639,208 B2
(45) Date of Patent: May 26, 2026

(54) EXCEPTION LIST COMPRESSION FOR LOGICAL-TO-PHYSICAL TABLES

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/642,030

(22) Filed: Apr. 22, 2024

(65) Prior Publication Data

US 2024/0385958 A1 Nov. 21, 2024

Related U.S. Application Data

(60) Provisional application No. 63/503,201, filed on May 19, 2023.

(51) Int. Cl.
*G06F 12/02* (2006.01)
(52) U.S. Cl.
CPC .. *G06F 12/0246* (2013.01); *G06F 2212/7201* (2013.01)
(58) Field of Classification Search
CPC ......... G06F 12/0246; G06F 2212/7201; G06F 2212/1044; G06F 2212/401
See application file for complete search history.

(56) References Cited

U.S. PATENT DOCUMENTS

| | | | | |
|---|---|---|---|---|
| 10,810,132 | B1 * | 10/2020 | Van Gaasbeck | .... G06F 12/0246 |
| 2009/0070543 | A1 * | 3/2009 | Oh | ........................ H04N 19/593 |
| | | | | 711/170 |
| 2012/0210041 | A1 * | 8/2012 | Flynn | ................... H05K 7/1444 |
| | | | | 711/3 |
| 2021/0240627 | A1 * | 8/2021 | Jin | ......................... G06F 11/076 |
| 2021/0406185 | A1 * | 12/2021 | Guda | .................... G06F 3/0656 |
| 2022/0107886 | A1 * | 4/2022 | Palmer | ................ G06F 12/0246 |
| 2022/0147249 | A1 * | 5/2022 | Zimmerman | ....... G06F 12/0292 |

* cited by examiner

*Primary Examiner* — Tasnima Matin
(74) *Attorney, Agent, or Firm* — Harrity & Harrity, LLP

(57) ABSTRACT

In some implementations, a memory apparatus may compress a physical page table associated with a logical-to-physical (L2P) table, to obtain a compressed version of the physical page table, wherein the physical page table is associated with logical block address (LBA) and physical address pairs, wherein the compressed version is associated with a set of groups of LBAs and an exception list, and wherein the compressed version includes an indication of physical addresses associated with respective starting LBAs included in the set of groups and includes sequentiality indications for respective groups from the set of groups. The memory apparatus may receive, from a host system, a command indicating an LBA that is associated with the physical page table. The memory apparatus may perform a lookup operation using the compressed version of the physical page table to identify a physical address associated with the LBA.

20 Claims, 9 Drawing Sheets

500 ➞

305
L2P Table

| LBA | Physical Address |
|---|---|
| LBA 1 | Physical Address 1 |
| LBA 2 | Physical Address 2 |
| ⋮ | ⋮ |
| LBA *M* | Physical Address *M* |

450
Compressed L2P
table

| Group 0 | NAND physical address |
| | Sequentiality bitmap |
| | Exception list offset |
| | Zero count indication(s) |
| Group 1 | NAND physical address |
| | Sequentiality bitmap |
| | Exception list offset |
| | Zero count indication(s) |
| Group 2 | NAND physical address |
| | Sequentiality bitmap |
| | Exception list offset |
| | Zero count indication(s) |
| Group 3 | NAND physical address |
| | Sequentiality bitmap |
| | Exception list offset |
| | Zero count indication(s) |
| Group 4 | NAND physical address |
| | Sequentiality bitmap |
| | Exception list offset |
| | Zero count indication(s) |
| Group 5 | NAND physical address |
| | Sequentiality bitmap |
| | Exception list offset |
| | Zero count indication(s) |
| Group 6 | NAND physical address |
| | Sequentiality bitmap |
| | Exception list offset |
| | Zero count indication(s) |
| Group 7 | NAND physical address |
| | Sequentiality bitmap |
| | Exception list offset |
| | Zero count indication(s) |
| Exception List | Exception list entry 1 |
| | Exception list entry 2 |
| | Exception list entry 3 |
| | Exception list entry 4 |
| | Exception list entry 5 |
| | ... |
| | Exception list entry X |

FIG. 4B

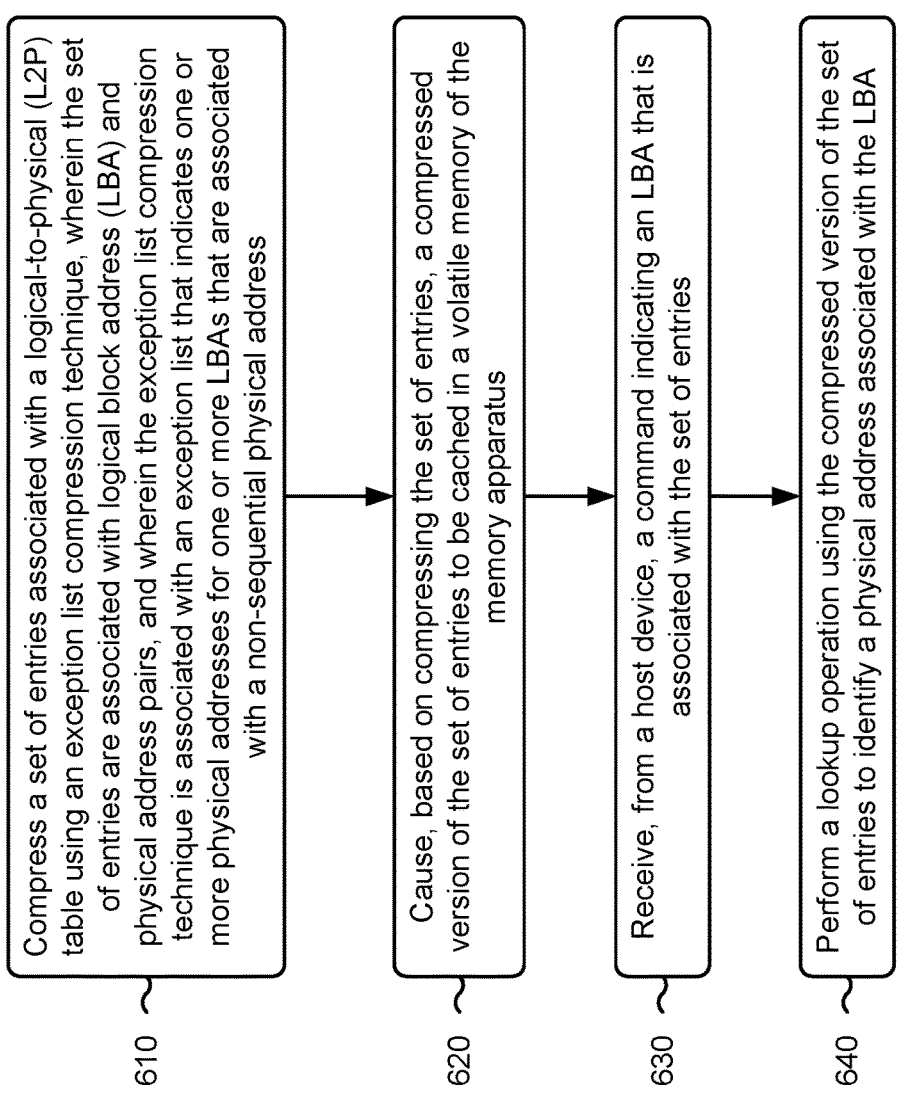

Compress a set of entries associated with a logical-to-physical (L2P) table using an exception list compression technique, wherein the set of entries are associated with logical block address (LBA) and physical address pairs, and wherein the exception list compression technique is associated with an exception list that indicates one or more physical addresses for one or more LBAs that are associated with a non-sequential physical address

610

Cause, based on compressing the set of entries, a compressed version of the set of entries to be cached in a volatile memory of the memory apparatus

620

Receive, from a host device, a command indicating an LBA that is associated with the set of entries

630

Perform a lookup operation using the compressed version of the set of entries to identify a physical address associated with the LBA

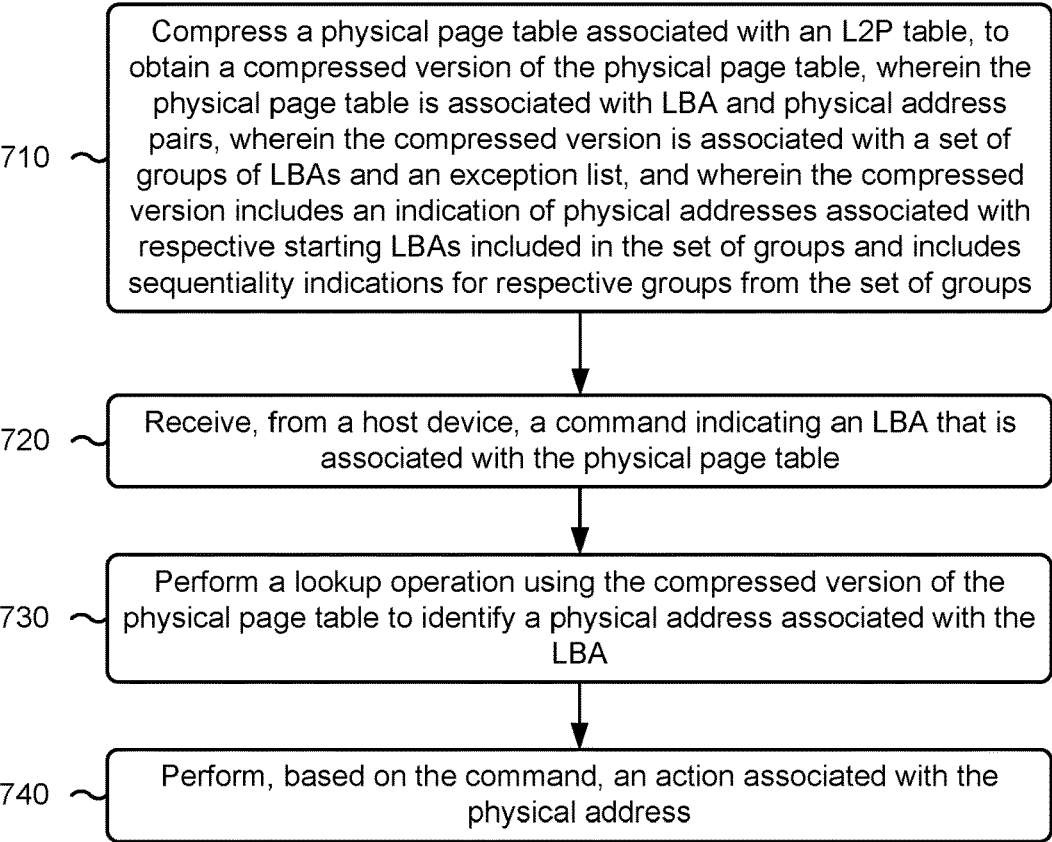

710 — Compress a physical page table associated with an L2P table, to obtain a compressed version of the physical page table, wherein the physical page table is associated with LBA and physical address pairs, wherein the compressed version is associated with a set of groups of LBAs and an exception list, and wherein the compressed version includes an indication of physical addresses associated with respective starting LBAs included in the set of groups and includes sequentiality indications for respective groups from the set of groups 720 — Receive, from a host device, a command indicating an LBA that is associated with the physical page table 730 — Perform a lookup operation using the compressed version of the physical page table to identify a physical address associated with the LBA 740 — Perform, based on the command, an action associated with the physical address

FIG. 7

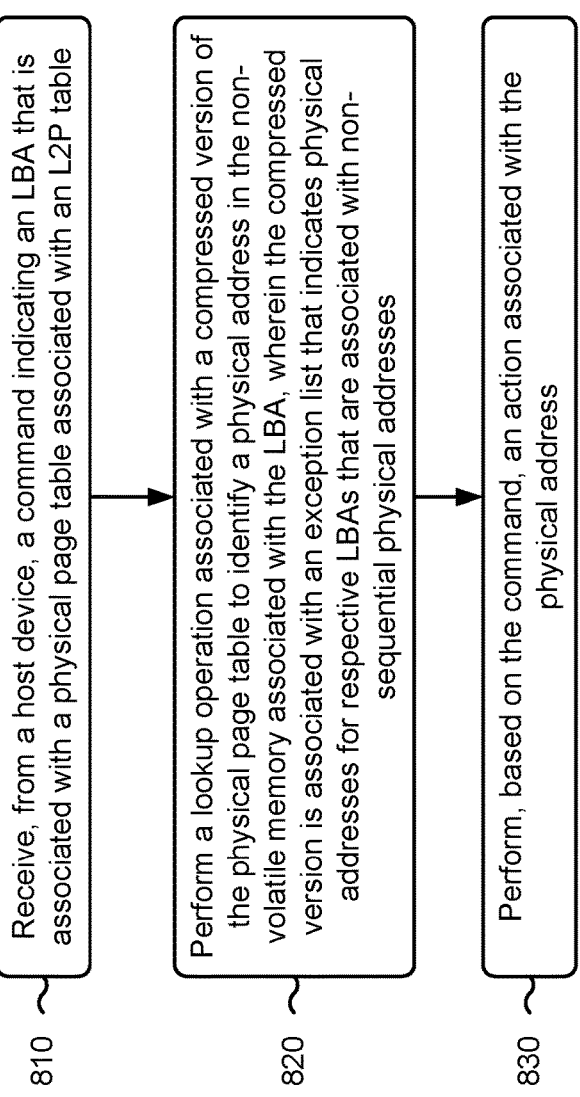

810 — Receive, from a host device, a command indicating an LBA that is associated with a physical page table associated with an L2P table 820 — Perform a lookup operation associated with a compressed version of the physical page table to identify a physical address in the non-volatile memory associated with the LBA, wherein the compressed version is associated with an exception list that indicates physical addresses for respective LBAs that are associated with non-sequential physical addresses 830 — Perform, based on the command, an action associated with the physical address

EXCEPTION LIST COMPRESSION FOR LOGICAL-TO-PHYSICAL TABLES

CROSS REFERENCE TO RELATED APPLICATION

This Patent Application claims priority to U.S. Provisional Patent Application No. 63/503,201, filed on May 19, 2023, and entitled "EXCEPTION LIST COMPRESSION FOR LOGICAL-TO-PHYSICAL TABLES." The disclosure of the prior Application is considered part of and is incorporated by reference into this Patent Application.

TECHNICAL FIELD

The present disclosure generally relates to memory devices, memory device operations, and, for example, to exception list compression for logical-to-physical (L2P) tables.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

BRIEF DESCRIPTION OF THE DRAWINGS

FIG. 3 is a diagram illustrating an example of an L2P table.

FIGS. 4A and 4B are diagram of an example of exception list compression for L2P tables.

FIG. 6 is a flowchart of an example method associated with exception list compression for L2P tables.

FIG. 7 is a flowchart of an example method associated with exception list compression for L2P tables.

FIG. 8 is a flowchart of an example method associated with exception list compression for L2P tables.

DETAILED DESCRIPTION

Figure 1:
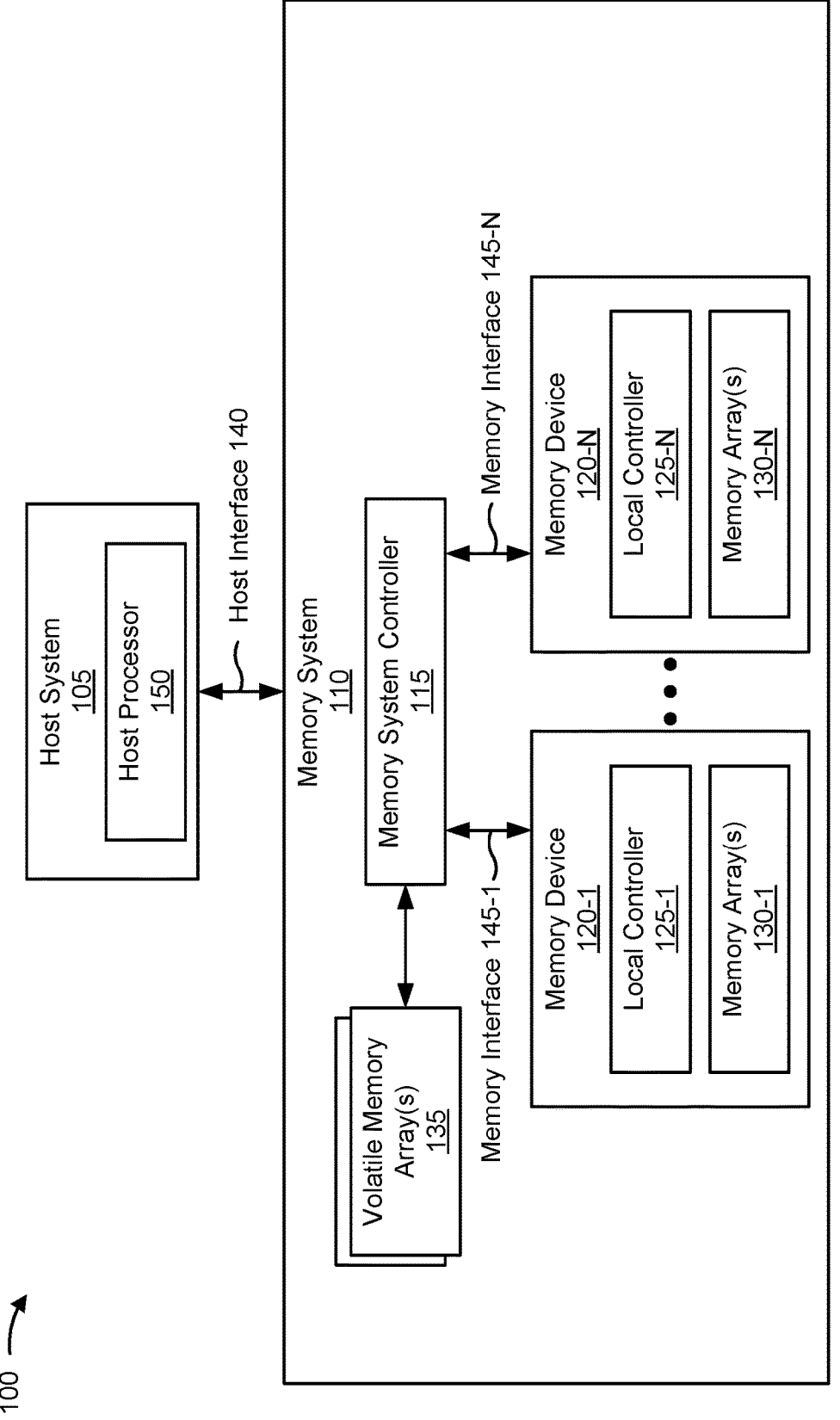
FIG. 1 is a diagram illustrating an example system capable of exception list compression for logical-to-physical (L2P) tables.

As storage capacity of non-volatile memory systems, such as a NAND memory system, increases, those non-volatile memory systems require an increasing amount of volatile memory, such as SRAM or DRAM, to enable fast performance of various memory operations, such as logical-to-physical (L2P) address translation. For example, one or more L2P address tables may be stored in and accessed from volatile memory (e.g., an SRAM array or a DRAM array) to enable faster memory translation than accessing those L2P tables from non-volatile memory, such as NAND memory. Larger capacity memory systems have more physical addresses where data can be stored, and so a larger L2P table is needed to store a larger quantity of logical address (e.g., logical block address (LBA)) to physical address mappings. This requirement for increased volatile memory storage capacity results in a larger memory system physical size (e.g., due to both larger capacity non-volatile memory and corresponding larger capacity volatile memory), consumes additional power to maintain and operate the volatile memory (e.g., for refresh operations), and/or results in increased manufacturing costs, among other examples. Reducing a required size of the volatile memory (e.g., for a given SSD capacity) would reduce a physical footprint of the memory system, would reduce power consumption of the memory system, and would reduce costs to manufacture and operate the memory system.

One technique to reduce volatile memory size is to use L2P table swapping, where only a portion of an L2P table is stored in volatile memory, and the remaining portion of the L2P table is stored in NAND memory. For example, a portion of the L2P table (e.g., an address range) may be cached in volatile memory. The memory system may swap or change the address range cached in the volatile memory over time. However, this technique requires additional memory operations (as compared to storing the entire L2P table in the volatile memory) to write portions of the L2P table from the volatile memory to non-volatile memory and to read portions of the L2P table from non-volatile memory to volatile memory. This increases the latency of L2P address translation and corresponding read and write operations, wears out the memory system more quickly, and causes write amplification issues, particularly in memory systems that operate in a write-intensive environment. Further, the memory system may have a limited amount of volatile memory storage (e.g., to reduce costs and/or a size of the memory system).

Additionally, because only a portion of the L2P table is stored in the volatile memory, an available address range for L2P address translations may be limited. For example, the memory system may only perform fast L2P address translations for LBAs included in an address range that is currently stored in the volatile memory. For other LBAs, the memory system may access the L2P table from non-volatile memory, which increases the latency associated with performing the L2P address translation. As a result, to maintain a smaller volatile memory size, a size of the address range cached in the volatile memory may be smaller, resulting in a lower likelihood that an LBA indicated in a command from a host system is cached in the volatile memory (e.g., and thereby increasing a latency associated with performing L2P address translation). To increase a likelihood that an LBA indicated in a command from a host system is cached in the volatile memory, a size of the address range may be increased, resulting in a larger volatile memory size.

Some implementations described herein enable exception list compression for L2P tables. For example, information associated with an address range (e.g., a physical page table) of an L2P table may be compressed (e.g., to reduce a size of the information to be stored in volatile memory) using the exception list compression described herein. As a result, a size of the information associated with the address range is reduced. This enables a larger address range of the L2P table to be stored in volatile memory of the memory system. Storing a larger address range of the L2P table in the volatile memory increases a likelihood that an LBA indicated in a command is included in the address range (e.g., increases an L2P cache hit rate). This reduces a likelihood that the memory system will need to access the L2P table stored in non-volatile memory, thereby increasing a likelihood that a lower latency L2P address translation can be performed (e.g., using the compressed information stored in the volatile memory).

In some implementations, the exception list compression may include an exception list that indicates one or more physical addresses for one or more LBAs that are associated with a non-sequential physical address. For example, in an initial write operation, LBAs may be written to physical addresses following a sequential order of the LBAs and the physical addresses (e.g., physical addresses in non-volatile memory). However, over time, data associated with some LBAs may be re-written to different (e.g., random) physical addresses. This may result in some physical addresses not having a sequential physical address with respect to other LBAs in a logical order of the LBAs. For example, an LBA 1 may be associated with a physical address 1, an LBA 2 may be associated with a physical address 2, and an LBA 3 may be associated with a physical address 3 (e.g., where LBA 1, LBA 2, and LBA 3 are sequential LBAs in a logical order of the LBAs and the physical address 1, the physical address 2, and the physical address 3 are sequential physical addresses in the non-volatile memory). Data associated with the LBA 2 may be re-written and/or overwritten to a physical address 4. As a result, the physical address mapped to the LBA 2 may no longer be sequential with respect to the physical addresses mapped to the LBA 1 and the LBA 2. The non-sequential physical addresses may increase a compression complexity associated with an address range of the L2P table. To mitigate the compression complexity, an exception list may be maintained that indicates the physical addresses of LBAs that are associated with non-sequential physical addresses.

Physical addresses of other LBAs (e.g., that are associated with sequential physical addresses) may be indicated based on a physical address of another LBA and a logical ordering of the LBAs. For example, if the LBA 1 is associated with a physical address 1, then the LBA 3 may be associated with a physical address 3 if the LBA 3 is associated with a sequential physical address. The physical address 3 can be indicated by indicating the physical address 1 and indicating that the LBA 3 is associated with a sequential physical address, thereby reducing a size of the information needed to indicate the physical address 3. Other L2P address mappings associated with sequential physical addresses may be indicated in a similar manner. If the information in the volatile memory indicates that an LBA is associated with a non-sequential physical address, then the memory system may determine the physical address of the LBA via an entry in the exception list.

In some implementations, LBAs included in an address range (e.g., in a set of entries of the L2P table) may be grouped into a set of groups (e.g., a group may include a set of consecutive LBAs from the address range). The compressed version of the address range may include, for each group, an indication of a physical address associated with a first LBA included in the group (e.g., first with respect to the logical ordering of the LBAs). Additionally, each group may include indications (e.g., a bitmap) of whether other LBAs included in the group of LBAs are associated with sequential physical addresses with respect to the physical address associated with the first LBA. In some implementations, each group may include an indication of a location within the exception list that is associated with LBAs included in the group (e.g., to reduce a processing time associated with identifying an entry in the exception list associated with a given group).

FIG. 1 is a diagram illustrating an example system 100 capable of exception list compression for logical-to-physical tables. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 145. The host processor 145 may include one or more processors configured to execute instructions and store data in the memory system 110. For example, the host processor 145 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, and/or a DIMM interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130 and/or a volatile memory array 135).

In some implementations, one or more systems, devices, apparatuses, components, and/or controllers of FIG. 1 may be configured to: compress a set of entries associated with an L2P table using an exception list compression technique, wherein the set of entries are associated with LBA and physical address pairs, and wherein the exception list compression technique is associated with an exception list that indicates one or more physical addresses for one or more LBAs that are associated with a non-sequential physical address; cause, based on compressing the set of entries, a compressed version of the set of entries to be cached in a volatile memory of the memory apparatus; receive, from a host system, a command indicating an LBA that is associated with the set of entries; and perform a lookup operation using the compressed version of the set of entries to identify a physical address associated with the LBA.

In some implementations, one or more systems, devices, apparatuses, components, and/or controllers of FIG. 1 may be configured to: compress a physical page table associated with an L2P table, to obtain a compressed version of the physical page table, wherein the physical page table is associated with LBA and physical address pairs, wherein the compressed version is associated with a set of groups of LBAs and an exception list, and wherein the compressed version includes an indication of physical addresses associated with respective starting LBAs included in the set of groups and includes sequentiality indications for respective groups from the set of groups; receive, from a host system, a command indicating an LBA that is associated with the physical page table; perform a lookup operation using the compressed version of the physical page table to identify a physical address associated with the LBA; and perform, based on the command, an action associated with the physical address.

In some implementations, one or more systems, devices, apparatuses, components, and/or controllers of FIG. 1 may be configured to: receive, from a host system, a command indicating an LBA that is associated with a physical page table associated with an L2P table; perform a lookup operation associated with a compressed version of the physical page table to identify a physical address in the non-volatile memory associated with the LBA, wherein the compressed version is associated with an exception list that indicates physical addresses for respective LBAs that are associated with non-sequential physical addresses; and perform, based on the command, an action associated with the physical address.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
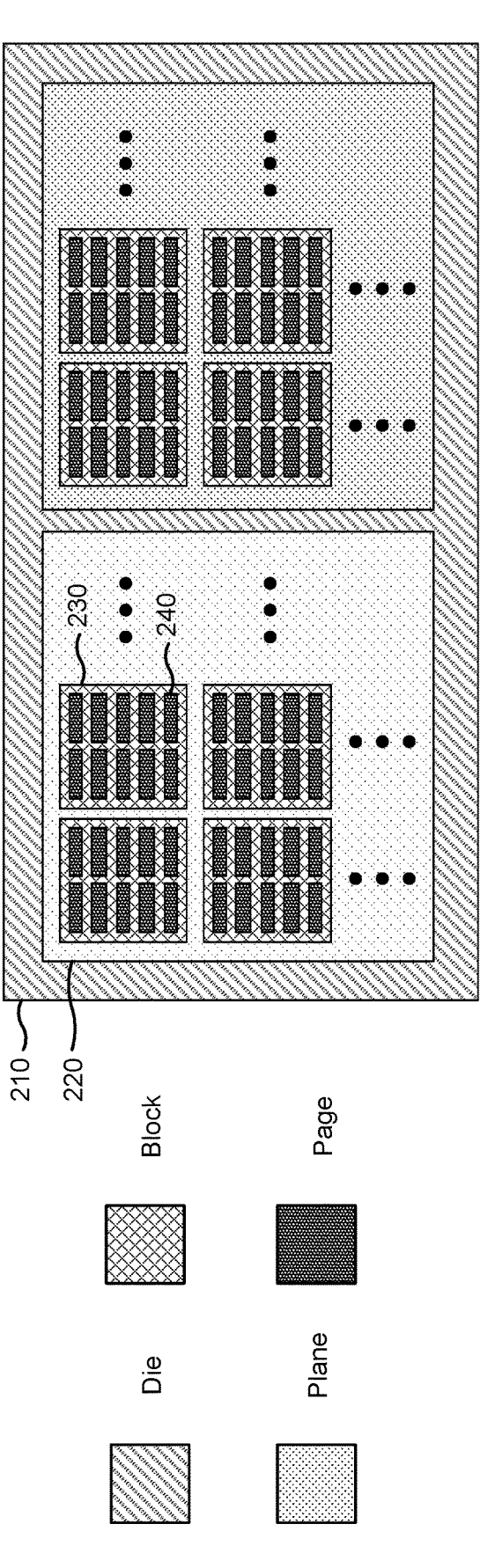
FIG. 2 is a diagram illustrating an example memory architecture that may be used by the memory system and/or a memory device.

FIG. 2 is a diagram illustrating an example memory architecture 200 that may be used by the memory system 110 and/or a memory device 120. For example, the memory device 120 may use the memory architecture 200 to store data. For example, a memory array 130 may include the memory architecture 200. FIG. 2 depicts an example representation (e.g., physical representation) of a memory device 120. As shown, the memory architecture 200 may include a die 210, which may include multiple planes 220. A plane 220 may include multiple blocks 230. The die 210 may be, or may be similar to, a memory device 120. For example, the memory device 120 may include a memory array 135 (and/or volatile memory array 135). The memory array 135 (and/or volatile memory array 135) may include one or more planes 220, one or more blocks 230, and/or one or more pages 240, among other examples. A block 230 may include multiple pages 240. Although FIG. 2 shows a particular quantity of planes 220 per die 210, a particular quantity of blocks 230 per plane 220, and a particular quantity of pages 240 per block 230, these quantities may be different than what is shown. In some implementations, the memory architecture 200 is a NAND memory architecture.

The die 210 is a structure made of semiconductor material, such as silicon. In some implementations, a die 210 is the smallest unit of memory that can independently execute commands. A memory device 120 may include one or more dies 210. In some implementations, the memory device 120 may include multiple dies 210. In this case, multiples dies 210 may each perform a respective memory operation (e.g., a read operation, a write operation, or an erase operation) in parallel. For example, a controller of the memory system 110 (e.g., the memory system controller 115 or one or more local controllers 125) may be configured to concurrently perform memory operations on multiple dies 210 for parallel control.

Each die 210 of a memory device 120 includes one or more planes 220. A plane 220 is sometimes called a memory plane. In some implementations, identical and concurrent operations can be performed on multiple planes 220 (sometimes with restrictions). For example, a multi-plane command (e.g., a multi-plane read command or a multi-plane write command) may be executed on multiple planes 220 concurrently, whereas a single plane command (e.g., a single plane read command or a single plane write command) may be executed on a single plane 220. A logical unit of the memory device 120 may include one or more planes 220 of a die 210. In some implementations, a logical unit may include all planes 220 of a die 210 and may be equivalent to a die 210. Alternatively, a logical unit may include fewer than all planes 220 of a die 210. A logical unit may be identified by a logical unit number (LUN). Depending on the context, the term "LUN" may refer to a logical unit or an identifier (e.g., a number) of that logical unit.

Each plane 220 includes multiple blocks 230. A block 230 is sometimes called a memory block. Each block 230 includes multiple pages 240. A page 240 is sometimes called a memory page. A block 230 is the smallest unit of memory that can be erased. In other words, an individual page 240 of a block 230 cannot be erased without erasing every other page 240 of the block 230. A page 240 is the smallest unit of memory to which data can be written (i.e., the smallest unit of memory that can be programmed with data). The terminology "programming" memory and "writing to" memory may be used interchangeably. A page 240 may include multiple memory cells that are accessible via the same access line (sometimes called a word line). In some implementations, a block 230 may be divided into multiple sub-blocks. A sub-block is a portion of a block 230 and may include a subset of pages 240 of the block and/or a subset of memory cells of the block 230.

In some implementations, read and write operations are performed for a specific page 240, while erase operations are performed for a block 230 (e.g., all pages 240 in the block 230). In some implementations, to prevent wearing out of memory, all pages 240 of a block 230 may be programmed before the block 230 is erased to enable a new program operation to be performed to a page 240 of the block 230. After a page 240 is programmed with data, that data can be erased, but that data cannot be overwritten with new data prior to being erased. The erase operation would erase all pages 240 in the block 230, and erasing the entire block 230 every time that new data is to replace old data would quickly wear out the memory cells of the block 230. Thus, rather than performing an erase operation, the new data may be stored in a new page (e.g., an empty page), and the old page that stores the old data may be marked as invalid. The memory device 120 may then point operations associated with the data to the new page (e.g., in an address table) and may track invalid pages to prevent program operations from being performed on invalid pages prior to an erase operation.

As indicated above, FIG. 2 is provided as an example. Other examples may differ from what is described with regard to FIG. 2.

FIG. 3 is a diagram illustrating an example 300 of an L2P table 305. For example, FIG. 3 depicts an example of memory address translation. As shown in FIG. 3, the memory system 110 may store one or more address translation tables. An address translation table may be referred to as an L2P mapping table, an L2P address table, or an L2P table, and may be used to translate a logical memory address to a physical memory address.

For example, the memory system 110 may receive a command (e.g., from a host system 105), and the command may indicate a logical memory address, such as an LBA, which is sometimes called a host address. The memory system 110 may use one or more address translation tables to identify a physical memory address (sometimes called a physical address) corresponding to the logical memory address. For example, a read command may indicate an LBA from which data is to be read, or a write command may indicate an LBA to which data is to be written (or to overwrite data previously written to that LBA). The memory system 110 may translate that LBA (or multiple LBAs) to a physical address associated with the memory system 110 (e.g., a physical address in a memory array 130) using an L2P table (or multiple L2P tables). The physical address may indicate a physical location in non-volatile memory, such as a die, a plane, a block, a page, and/or a portion of the page where the data is located.

In some implementations, the memory system 110 may use a logical address called a translation unit (TU), which may correspond to one or more LBAs. For example, an entry in an L2P table may indicate a mapping between a TU (e.g., indicated by a TU index value) and a physical address where data associated with that TU is stored. In some implementations, the physical address may indicate a die, a plane, a block, and a page of the TU. In other examples, the physical address may indicate a die, a plane, a block, and/or a page where data associated with an LBA is written or programmed to.

The memory system 110 may use an L2P table 305 for performing L2P address translations. For example, the L2P table 305 may map logical addresses (e.g., LBAs) to physical addresses in a non-volatile memory of the memory system 110 (e.g., physical addresses in one or more memory arrays 130 of the memory system 110). Although an LBA is described herein as an example of a logical address included in the L2P table 305, other logical addresses or logical units, such as a TU, or a set of LBAs, among other examples, may be used in a similar manner as described herein. In some implementations, the L2P table 305 may be an entire L2P table. In other implementations, the L2P table 305 may be a portion of an L2P table (e.g., a set of entries of the L2P table and/or an address range associated with the L2P table), and/or a physical page table (PPT) associated with an L2P table, among other examples. For example, the L2P table 305 may include a set of LBA and physical address pairs (e.g., a pair may include an LBA and the corresponding physical address, associated with the LBA, in non-volatile memory).

As indicated above, FIG. 3 is provided as an example. Other examples may differ from what is described with regard to FIG. 3.

Figure 4A:
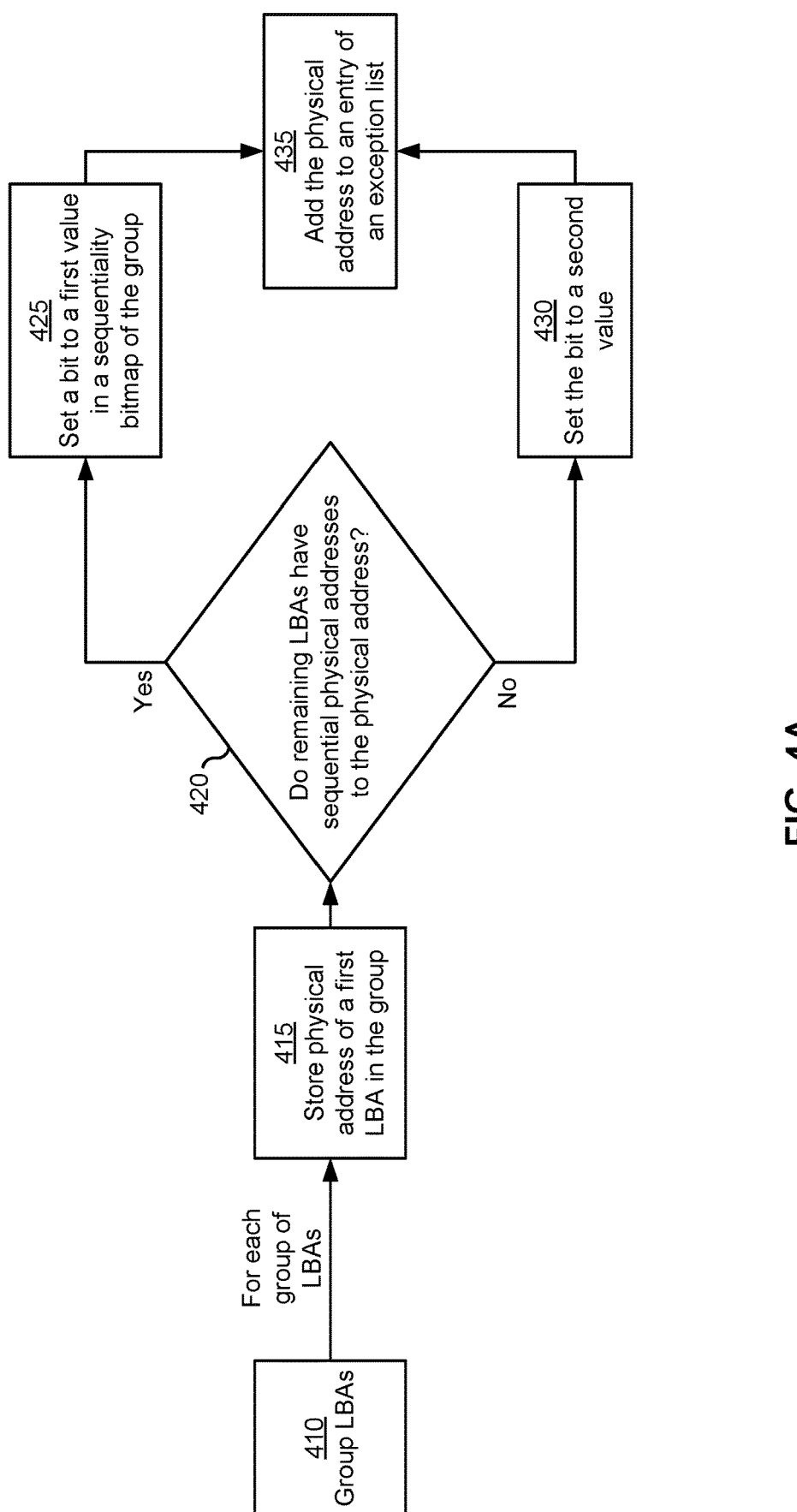

FIGS. 4A and 4B are diagram of a process 400 of exception list compression for L2P tables. The process 400 is associated with compressing an L2P table (or an address range of the L2P table) using an exception list compression technique. The operations described in connection with FIGS. 4A and 4B may be performed by the memory system 110 and/or one or more components of the memory system 110, such as the memory system controller 115, one or more memory devices 120, and/or one or more local controllers 125.

A memory apparatus (e.g., the memory system 110, the memory system controller 115, one or more memory devices 120, and/or one or more local controllers 125) may store an uncompressed L2P table, such as the L2P table 305 (e.g., in non-volatile memory). In some implementations, the memory apparatus may load or write the uncompressed L2P table from non-volatile memory to volatile memory to generate a compressed version of the L2P table, as described in more detail elsewhere herein. In some implementations, the uncompressed L2P table may loaded and processed by the memory system controller 115 to compress the L2P table, as described in more detail elsewhere herein. Given the limited volatile memory in the memory system 110, the process 600 enables the smaller generated compressed version of the L2P table to be used for memory operations instead of the larger uncompressed L2P table, thereby reducing a size of the L2P table stored in the volatile memory The memory system 110 may use an L2P table, such as the L2P table 305, for performing L2P address translations. As shown by reference number 410, a memory apparatus (e.g., the memory system 110 and/or one or more components of the memory system 110, such as the memory system controller 115, one or more memory devices 120, and/or one or more local controllers 125) may group a set of LBAs. For example, the set of LBAs may be LBAs included in the L2P table 305. In some implementations, the set of LBAs may be associated with an address range of the L2P table 305 (e.g., may be associated with a subset of entries from a set of entries included in the L2P table 305). In some implementations, the set of LBAs may be associated with a PPT. The memory apparatus may group the LBAs into a set of groups.

In some implementations, each group may include the same quantity of LBAs. In other examples, the groups may include different quantities of LBAs. A group may include a set of sequential LBAs (e.g., sequential in a logical order of the LBAs). In other words, a group of LBAs may include a set of logically sequential LBAs. For example, if the set of LBAs includes an LBA 0 through an LBA 1023 (e.g., 1024 LBAs), then a first group may include LBA 0 through LBA 127, a second group may include LBA 128 through LBA 255, a third group may include LBA 256 through LBA 383, and so on (e.g., where each group includes 128 LBAs).

The memory apparatus may perform one or more operations associated with the set of groups of LBAs to compress the L2P table 305. For example, as shown in FIG. 4A, the memory apparatus may perform one or more operations for each group of LBAs. For example, as shown by reference number 415, the memory apparatus may store an indication of a physical address of a first LBA in a given group. The first LBA may be referred to as a starting LBA or a base LBA. For example, the first LBA may be an LBA with a lowest (or highest) identifier or index value among LBAs included in the group (e.g., the first LBA may be "first" with respect to a logical ordering of LBAs included in the group). In other words, for each group of LBAs, the memory apparatus may store an indication of one (e.g., a single) physical address of an LBA included in that group. The LBA may be the "first" LBA in the group (e.g., according to the logical order of the LBAs) or may be another LBA in the group.

As shown by reference number 420, the memory apparatus may determine whether remaining LBAs in the group have sequential physical addresses with respect to the physical address stored for the group. For example, as described elsewhere herein, during an initial programming or writing of data, data associated with different LBAs may be written or programmed to sequential physical addresses (e.g., following a logical order of the physical addresses). For example, data associated with an LBA 1 may be written to a physical address 1, data associated with an LBA 2 may be written to a physical address 2, data associated with an LBA 3 may be written to a physical address 3, and so on. The logical order of the LBAs may not change over time. However, in some cases, data of a given LBA may be re-written to a different physical address. For example, the data associated with the LBA 2 may be written to a physical address 4. LBAs that have data re-written to a different physical address (e.g., that is different than the sequential physical address) may be associated with a non-sequential physical address.

For example, the memory apparatus may determine whether an LBA is associated with a sequential physical address by comparing a location of the LBA in a logical ordering of LBAs included in the group to a position of the physical address of the LBA with respect to the physical address of the first LBA that is stored for the group (e.g., as described above in connection with reference number 415).

For example, if the LBA is the $L^{th}$ LBA included in the group (e.g., in accordance with the logical order of the LBAs), then the physical address of the LBA may be a sequential physical address if the physical address is in an $L^{th}$ position with respect to a physical address of the first LBA of the group (e.g., in accordance with a logical order of the physical addresses). If the physical address is not in the $L^{th}$ position with respect to the physical address of the first LBA of the group, then the physical address of the LBA may be a non-sequential physical address. The logical order of the physical addresses may be defined based on identifiers or index values of respective physical addresses associated with non-volatile memory of the memory apparatus (e.g., of the memory system 110).

In some implementations, the memory apparatus may determine that a given LBA is associated with a sequential physical address (e.g., "Yes" from the determination indicated by reference number 420). As a result, the memory apparatus may cause an indication that the given LBA is associated with a sequential physical address to be stored in association with the group that the given LBA is included in. For example, each group may be associated with a set of indications for respective LBAs included in the group. An indication, from the set of indications, may indicate whether an LBA associated with the indication is associated with a sequential physical address. In some implementations, the indications may be included in a bitmap (e.g., referred to herein as a sequentiality bitmap). For example, a bitmap may be a data structure that includes bits for respective LBAs included in the group (e.g., where each bit is associated with a given (e.g., a single) LBA). For example, as shown by reference number 425, if the LBA is associated with a sequential physical address (e.g., "Yes), then the memory apparatus may set a bit associated with the LBA to a first value (e.g., a bit value of "1") in a sequentiality bitmap of the group.

Alternatively, the memory apparatus may determine that the LBA does not have a sequential physical address (e.g., "No" from the determination indicated by reference number 420). For example, the memory apparatus may determine that the LBA is associated with a non-sequential physical address with respect to the physical address of the first LBA included in the group. As a result, the memory apparatus may cause an indication to be stored in association with the group indicating that the LBA is associated with a non-sequential physical address. For example, as shown by reference number 430, if the LBA is associated with a non-sequential physical address (e.g., "No"), then the memory apparatus may set a bit associated with the LBA to a second value (e.g., a bit value of "0") in the sequentiality bitmap of the group.

If the LBA is associated with a non-sequential physical address, then the memory apparatus may cause a physical address associated with the LBA to be stored in the exception list. For example, at a start of a compression operation associated with the L2P table 305, the memory apparatus may initialize the exception list. The memory apparatus may set a tracker of a current position in the exception list to a first position of the exception list. For example, the memory apparatus may maintain an exception list offset value that indicates a position (e.g., an entry) in the exception list relative to the first position (e.g., first entry) of the exception list. The memory apparatus may set the exception list offset value to zero (0) at a start of a compression operation associated with the L2P table 305. The exception list offset value may be used by the memory apparatus to track a current position in the exception list during the compression operation.

For example, as shown by reference number 435, the memory apparatus may add the physical address associated with the LBA to an entry (e.g., a current entry) in the exception list. For example, if the exception list offset value is zero, then the memory apparatus may add the physical address associated with the LBA to the first entry in the exception list. After adding the physical address to the exception list, the memory apparatus may increment the exception list offset value. For example, if the exception list offset value is zero, then after adding the physical address to the first entry in the exception list, the memory apparatus may increment the exception list offset value to a value of one (1).

In some implementations, at a start of a compression operation for a given group, the memory apparatus may store an indication of a current value of the exception list offset value. For example, for each group, the memory apparatus may store an indication of an exception list offset value. The exception list offset value may indicate an entry in the exception list at which information associated with a given group begins. This reduces processing time associated with the memory apparatus performing a lookup in the exception list because by indicating the entry in the exception list at which information associated with a given group begins, the memory apparatus may not be required to parse all entries of the exception list. Rather, the memory apparatus is enabled to start at an entry indicated by the exception list offset associated with the group to identify an entry in the exception list offset associated with an LBA included in the group.

In some implementations, the memory apparatus may maintain or track a quantity of LBAs included in a given group of LBAs that are associated with non-sequential physical addresses. For example, the memory apparatus may maintain or track a quantity of bits in the sequentiality bitmap that are set to the second value (e.g., set to zero (0)). For example, the memory apparatus may maintain a tracker (e.g., a zero count tracker if the second value is zero) that indicates the quantity of LBAs included in a given group of LBAs that are associated with non-sequential physical addresses. If the memory apparatus adds a physical address associated with an LBA to an entry (e.g., a current entry) in the exception list (and/or sets a bit in the sequentiality bitmap to the second value), then the memory apparatus may increment the tracker. In some implementations, the tracker may be referred to as a zero count indication (e.g., if the second value is zero). The tracker or indication(s) of the quantity of LBAs included in a given group of LBAs that are associated with non-sequential physical addresses are described in more detail in connection with FIG. 4B.

The memory apparatus may continue to process all LBAs included in a given group in a similar manner as described above. For example, for each LBA included in the group (e.g., except for the first LBA for which the physical address is stored in connection with the group), the memory apparatus may set values in the sequentiality bitmap for respective LBAs and selectively add physical addresses to the exception list for LBAs that are associated with non-sequential physical addresses, as described in more detail elsewhere herein. After processing all LBAs for a given group, the memory apparatus may perform similar (or the same) operations for LBAs included in a next group.

For example, the exception list compression operation may include beginning with a set of uncompressed LBA and physical address pairs (e.g., an uncompressed address range of an L2P table). The memory apparatus may set the exception list offset value to zero (0). For each group of LBAs, the memory apparatus may store the current value of the exception list as the base offset for this group. The memory apparatus may capture and store the address of the first LBA as a physical address (e.g., a base physical address for the group) that is stored for the group. For the remaining LBAs included in the group, if the LBA physical address is sequential to the base physical address at a proper offset (e.g., in accordance with a logical ordering of the LBAs and physical addresses), then the memory apparatus may set a bit, corresponding to the LBA, in the sequentiality bitmap associated with the group to the first value (e.g., to a bit value of "1"). Otherwise (e.g., if the LBA physical address is not sequential to the base physical address at the proper offset), then the memory apparatus may set a bit, corresponding to the LBA, in the sequentiality bitmap associated with the group to the second value (e.g., to a bit value of "0"). Additionally, the memory apparatus may increment a counter (e.g., a zero count tracker) associated with the position of the bit in the bitmap to indicate that an additional LBA in the group is associated with a non-sequential physical address. Additionally, the memory apparatus may store the physical address associated with the LBA in a current entry of the exception list (e.g., as indicated by the current value of the exception list offset value). The memory apparatus may increment the exception list offset value. For example, a compressed version of an address range that is associated with fully sequential physical addresses may have all bits of all sequentiality bitmaps set to the first value, all zero count trackers set to zero, and no entries in the exception list (e.g., no physical addresses stored in the exception list).

The memory apparatus may decompress a compressed version of the address range (e.g., a compressed version of the address range of a physical page table) based on identifying physical addresses of respective LBAs following a logical order of the respective LBAs based on iterating the physical addresses associated with the respective starting LBAs included in the set of groups or based on information included in an entry included in the exception list. For example, to decompress a compressed version of the address range, the memory apparatus may set the exception list offset value to zero (0). For each group of LBAs, the memory apparatus may identify the base physical address associated with the group and may store the base physical address as being associated with the first LBA of the group in an entry of an L2P table. For each group of LBAs, the memory apparatus may iterate through the sequentiality bitmap associated with that group. If a given bit is set to the first value, then the memory apparatus may determine the physical address associated with an LBA corresponding to the given bit by incrementing the base physical address according to a logical ordering of the LBAs (e.g., according to a position of the given bit in the sequentiality bitmap). If a given bit is set to the second value, then the memory apparatus may determine the physical address associated with an LBA corresponding to the given bit from a next entry in the exception list (e.g., as indicated by a current value of the exception list offset value). After obtaining the physical address from the entry of the exception list, the memory apparatus may increment the exception list offset value. The memory apparatus may compile entries for the L2P table (e.g., of LBAs and corresponding physical addresses) for all groups of LBAs and all LBAs in a given group in a similar manner as described above.

In some implementations, the memory apparatus may perform updates directly to the compressed version. For example, the memory apparatus may update a physical address associated with a given LBA by updating a bit associated with the given LBA in a sequentiality bitmap and adding an entry to or updating the exception list to indicate the new physical address associated with the given LBA (e.g., assuming that the new physical address is a non-sequential physical address). Alternatively, the memory apparatus may perform updates by decompressing the compressed version, updating the L2P table, and re-compressing the L2P table after performing the updates.

FIG. 4B shows an example compressed L2P table 450. As described elsewhere herein, the compressed L2P table 450 may be a compressed version of an address range or a set of entries of an L2P table. For example, the compressed L2P table 450 may be a compressed version of a PPT. The compressed L2P table 450 includes eight groups of LBAs. In other examples, the compressed L2P table 450 may include a different quantity of groups of LBAs.

As shown in FIG. 4B, each group of LBAs may be associated with a physical address (e.g., a NAND physical address or a non-volatile memory physical address). The physical address may be the physical address of a first LBA included in the group of LBAs. For example, the physical address may be the base physical address (or a starting physical address) for the group, as described in more detail elsewhere herein. Additionally, each group of LBAs may be associated with a sequentiality bitmap. As described elsewhere herein, the sequentiality bitmap may indicate whether LBAs included in the group are associated with sequential or non-sequential physical addresses (e.g., with respect to the physical address stored in connection with the group).

Each group may include an indication of an exception list offset value associated with the group. The exception list offset value may indicate an entry in the exception list at which a first physical address for an LBA included in the group may be stored. In some cases, no physical addresses for LBA included in a given group may be included in the exception list (e.g., all LBAs in the group may be associated with sequential physical addresses). In such examples, the exception list offset value for the given group and a next group may be the same value (e.g., if the given group is Group 2, then the exception list offset value for the Group 2 and the Group 3 may be the same value).

In some implementations, each group may include one or more zero count indications. As described above, a zero count indication may be an indication of a quantity of LBAs included in the group that are associated with non-sequential physical addresses. In some implementations, each group may be associated with multiple zero count indications associated with respective portions of the sequentiality bitmap of the group. For example, a first zero count indication may indicate a quantity of bits associated with the second value (e.g., zero) in a first B bits of the sequentiality bitmap, a second zero count indication may indicate a quantity of bits associated with the second value in a second B bits of the sequentiality bitmap, a third zero count indication may indicate a quantity of bits associated with the second value in a third B bits of the sequentiality bitmap, and so on. In some implementations, each zero count indication may be a Z-bit aggregation (e.g., where $Z \geq 1$). For example, each zero count indication may be 4-bit aggregation (sometimes referred to as half an octet or a "nibble"), capable of indicating sixteen different values. In some implementations, each zero count indication may be a B-bit aggregation (e.g., where the quantity of bits for each zero count indication is the value of B).

This enables the memory apparatus to quickly identify an entry in the exception list associated with a given LBA. For example, if the given LBA is associated with a bit included in the third B bits of the sequentiality bitmap, then the memory apparatus may add the first zero count and the second zero count indication to obtain an offset value. The memory apparatus may add the offset value to the exception list offset value associated with the group to identify a first entry in the exception list associated with the third B bits of the sequentiality bitmap. The memory apparatus may identify the entry in the exception list associated with the given LBA based on the first entry in the exception list associated with the third B bits and a quantity of bits included in the third B bits positioned before a bit associated with the given LBA that are associated with the second value. For example, if there are two bits in the third B bits positioned before the bit associated with the given LBA that are associated with the second value, then the memory apparatus may determine that the physical address associated with the given LBA is stored in an entry that is two entries after the first entry in the exception list associated with the third B bits. This reduces a processing time associated with identifying the entry in the exception list associated with the given LBA because a quantity of entries and/or bits to be counted by the memory apparatus is reduced (e.g., the memory apparatus is not required to parse the entire exception list to identify the entry and may start at a more specific location in the exception list when identifying the entry).

As shown in FIG. 4B, the compressed L2P table 450 may include the exception list. The exception list may include X entries. An entry may indicate a physical address in non-volatile memory associated with the memory apparatus. As described in more detail elsewhere herein, the exception list may indicate physical addresses for LBAs that are associated with non-sequential physical addresses.

As indicated above, FIGS. 4A and 4B are provided as examples. Other examples may differ from what is described with regard to FIGS. 4A and 4B.

Figure 5:
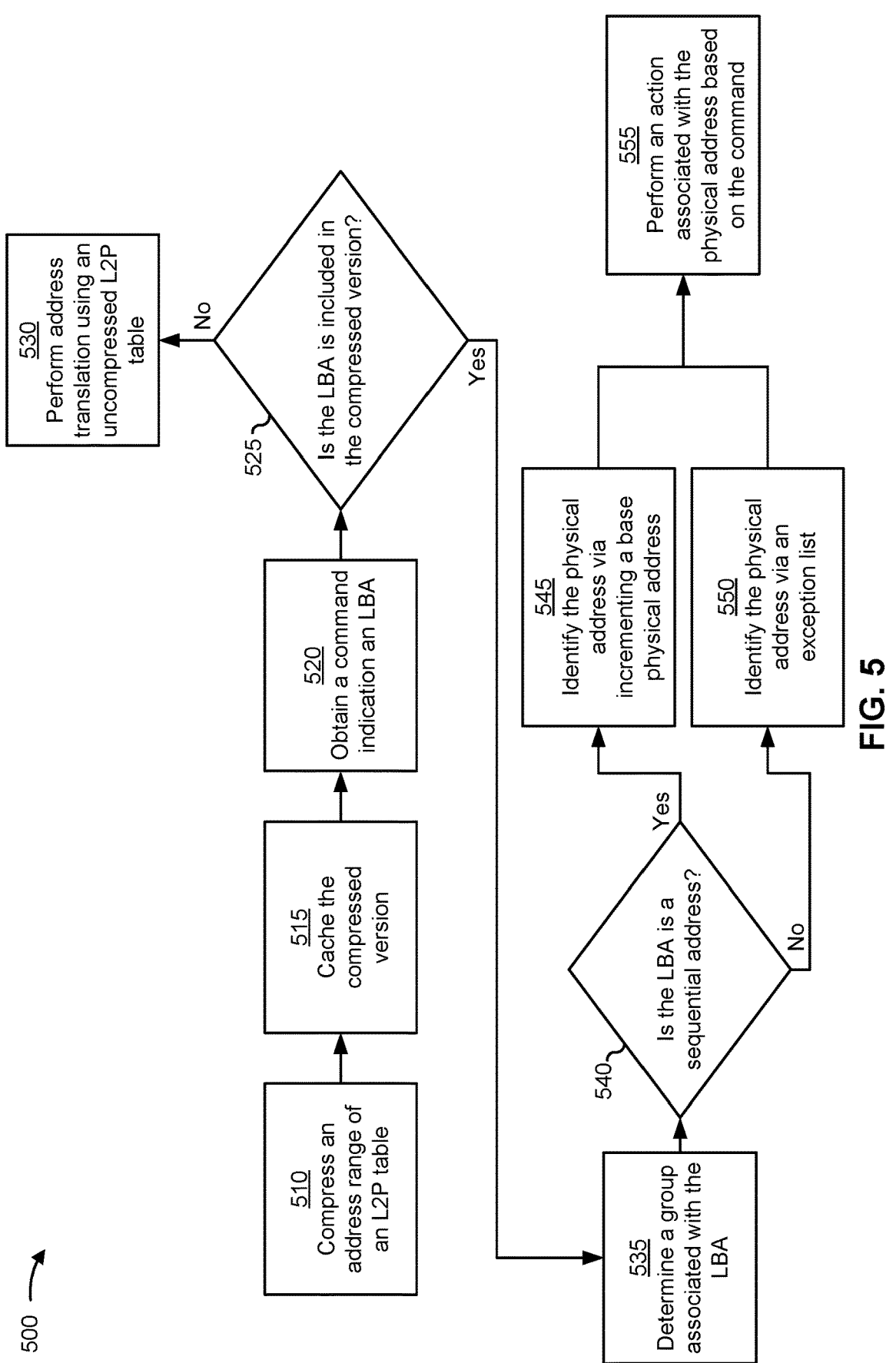
FIG. 5 is a diagram of an example of exception list compression for L2P tables.

FIG. 5 is a diagram of a process 500 of exception list compression for L2P tables. The process 500 is associated with a lookup operation using a compressed version of an L2P table (or a compressed version of an address range of the L2P table), where the compressed version is compressed using an exception list compression technique (e.g., in a similar manner as described in connection with FIGS. 4A and 4B). The operations described in connection with FIG. 5 may be performed by the memory system 110 and/or one or more components of the memory system 110, such as the memory system controller 115, one or more memory devices 120, and/or one or more local controllers 125. For example, some operations are depicted and described in connection with FIG. 5 as being performed by the memory system controller 115. However, in some cases, one or more (or all) operations described herein may be performed by one or more local controllers 125.

As shown by reference number 510, the memory system 110 and/or the memory system controller 115 (e.g., a memory apparatus) may compress an address range of an L2P table, such as the L2P table 305. For example, the memory system 110 and/or the memory system controller 115 may compress the address range (e.g., a PPT or a set of entries) using an exception list compression technique, such as by performing one or more operations described above in connection with FIGS. 4A and 4B. For example, the memory apparatus may compress a set of entries associated with an L2P table using the exception list compression technique.

As shown by reference number 515, the memory apparatus may cause, based on compressing the set of entries, a compressed version of the set of entries (e.g., a compressed version of the address range) to be cached in a volatile memory array, such as the volatile memory array 135. For example, the memory apparatus may store the compressed version in the volatile memory array.

As shown by reference number 520, the memory apparatus may obtain, from the host system 105, a command indicating an LBA that is associated with the set of entries. For example, the memory apparatus may receive a command indicating an LBA. As shown by reference number 525, the memory apparatus may determine whether the LBA is included in an address range that is associated with the compressed version of the address range stored in the volatile memory array. If the memory apparatus determines that the LBA is included in the compressed version (e.g., "Yes" from the determination indicated by reference number 525), then the memory apparatus may proceed with performing a fast address translation using the compressed version. If the memory apparatus determines that the LBA is not included in the compressed version (e.g., "No" from the determination indicated by reference number 525), then the memory apparatus may perform address translation for the LBA using an L2P table (e.g., an uncompressed L2P table) stored in another memory array, such as in a non-volatile memory array (e.g., as shown by reference number 530).

The memory apparatus may perform a lookup operation using the compressed version to identify a physical address associated with the LBA (e.g., based on determining that the LBA is included in a set of LBAs associated with the compressed version). For example, as shown by reference number 535, the memory apparatus may determine a group associated with the LBA. For example, as described elsewhere herein, the compressed version may be associated with a set of groups of LBAs. The memory apparatus may determine a group, from the set of groups, that is associated with the LBA indicated by the command.

As shown by reference number 540, the memory apparatus may determine whether the LBA is associated with a sequential physical address. For example, the memory apparatus may identify a bit, associated with the LBA, included in a sequentiality bitmap associated with the group. For example, the memory apparatus may identify the bit based on a logical order of the LBAs included in the group (e.g., if the LBA is a $5^{th}$ LBA in the logical ordering, then the bit may be the $5^{th}$ bit in the bitmap). If the bit is set to a first value (e.g., a bit value of "1"), then the memory apparatus may determine that the physical address of the LBA is a sequential physical address (e.g., "Yes" from the determination indicated by reference number 540). In such examples, as shown by reference number 545, the memory apparatus may determine the physical address associated with the LBA based on incrementing a base physical address or a starting physical address associated with the group. For example, as described elsewhere herein, the compressed version may include an indication of a physical address associated with each group (e.g., a base physical address or a starting physical address associated with each group). If the physical address is a sequential physical address, then the memory apparatus may determine the physical address by incrementing the base physical address of the group according to a position of the LBA in the logical ordering of the LBAs. For example, if the LBA is in an $S^{th}$ position of the logical ordering of the LBAs included in the group, then the memory apparatus may determine that the physical address is the base physical address incremented by S−1.

If the bit is set to a second value (e.g., a bit value of "0"), then the memory apparatus may determine that the physical address of the LBA is a non-sequential physical address (e.g., "No" from the determination indicated by reference number 540). In such examples, as shown by reference number 550, the memory apparatus may determine the physical address associated with the LBA based on an entry in the exception list included in the compressed version. For example, the memory apparatus may determine the entry associated with the LBA based on an exception list offset value associated with the group, one or more zero count indications associated with the group, and/or a position of the LBA in the logical ordering of the LBAs included in the group. For example, the memory apparatus may determine the entry associated with the LBA in a similar manner as described in more detail elsewhere herein, such as in connection with FIGS. 4A and 4B. The entry in the exception list may indicate the physical address associated with the LBA.

As a result, a size of the information associated with the address range stored in the volatile memory array 505 is reduced. This enables a larger address range of the L2P table to be stored in the volatile memory array 505. Storing a larger address range of the L2P table in the volatile memory array 505 increases a likelihood that an LBA indicated by the command is included in the address range (e.g., increases an L2P cache hit rate). This reduces a likelihood that the memory system will need to access the L2P table stored in non-volatile memory, thereby increasing a likelihood that a lower latency L2P address translation can be performed (e.g., using the compressed information stored in the volatile memory array 505). This improves the performance of the memory system 110.

As shown by reference number 555, the memory apparatus may perform an action associated with the physical address based on the command. For example, the command may indicate the operation to be performed. As an example, the memory apparatus may read data from the physical address and may provide the data to the host system 105. As another example, the memory apparatus may erase the data from the physical address. As another example, the memory apparatus may read the data from the physical address and may write the data to a different physical address.

As indicated above, FIG. 5 is provided as an example. Other examples may differ from what is described with regard to FIG. 5.

FIG. 6 is a flowchart of an example method 600 associated with exception list compression for L2P tables. In some implementations, a memory apparatus (e.g., the memory system 110 and/or the memory system controller 115) may perform or may be configured to perform the method 600. In some implementations, another device or a group of devices separate from or including the memory apparatus (e.g., the host system 105 and/or the host processor 145) may perform or may be configured to perform the method 600. Additionally, or alternatively, one or more components of the memory apparatus (e.g., one or more memory devices 120 and/or one or more local controllers 125) may perform or may be configured to perform the method 600. Thus, means for performing the method 600 may include the memory apparatus and/or one or more components of the memory apparatus. Additionally, or alternatively, a non-transitory computer-readable medium may store one or more instructions that, when executed by the memory apparatus, cause the memory apparatus to perform the method 600.

As shown in FIG. 6, the method 600 may include compressing a set of entries associated with an L2P table using an exception list compression technique, wherein the set of entries are associated with LBA and physical address pairs, and wherein the exception list compression technique is associated with an exception list that indicates one or more physical addresses for one or more LBAs that are associated with a non-sequential physical address (block 610). As further shown in FIG. 6, the method 600 may include causing, based on compressing the set of entries, a compressed version of the set of entries to be cached in a volatile memory of the memory apparatus (block 620). As further shown in FIG. 6, the method 600 may include receiving, from a host system, a command indicating an LBA that is associated with the set of entries (block 630). As further shown in FIG. 6, the method 600 may include performing a lookup operation using the compressed version of the set of entries to identify a physical address associated with the LBA (block 640).

The method 600 may include additional aspects, such as any single aspect or any combination of aspects described below and/or described in connection with one or more other methods or operations described elsewhere herein.

In a first aspect, the method 600 includes forming a set of groups of LBAs from LBAs associated with the set of entries, wherein a group of LBAs, from the set of groups, includes a set of consecutive LBAs, wherein the compressed version of the set of entries includes, for the group of LBAs, an indication of a physical address associated with a first LBA included in the group and indications of whether other LBAs included in the group of LBAs are associated with sequential physical addresses with respect to the physical address associated with the first LBA, and wherein the exception list includes physical addresses for any LBAs included in the group that are not associated with sequential physical addresses with respect to the physical address associated with the first LBA.

In a second aspect, alone or in combination with the first aspect, the indications of whether other LBAs included in the group are associated with sequential physical addresses include a bitmap.

In a third aspect, alone or in combination with one or more of the first and second aspects, the compressed version of the set of entries is associated with a set of groups of LBAs from LBAs associated with the set of entries, wherein each group includes a set of logically sequential LBAs, and wherein each group, from the set of groups, includes an indication of a non-volatile memory physical address associated with a first LBA, and a bitmap indicating whether other LBAs are associated with sequential non-volatile memory physical addresses with respect to the non-volatile memory physical address associated with the first LBA.

In a fourth aspect, alone or in combination with one or more of the first through third aspects, each group, from the set of groups, includes an exception list offset indicating a starting location in the exception list for LBAs included in that group.

In a fifth aspect, alone or in combination with one or more of the first through fourth aspects, each group, from the set of groups, includes one or more indications of a quantity of LBAs, from the set of logically sequential LBAs, that are not associated with sequential non-volatile memory physical addresses with respect to the non-volatile memory physical address associated with the first LBA.

In a sixth aspect, alone or in combination with one or more of the first through fifth aspects, the method 600 includes identifying a group of LBAs, from a set of groups of LBAs associated with the compressed version, associated with the LBA, identifying, based on an indication associated with the LBA included in a bitmap associated with the group, whether the LBA is associated with a sequential physical address with respect to a first physical address of a first LBA included in the group, and identifying the physical address associated with the LBA based on whether the LBA is associated with the sequential physical address with respect to a first physical address.

In a seventh aspect, alone or in combination with one or more of the first through sixth aspects, the method 600 includes identifying the physical address based on incrementing the first physical address if the LBA is associated with the sequential physical address with respect to the first physical address, or identifying the physical address from an entry, associated with the LBA, included in the exception list if the LBA is not associated with the sequential physical address with respect to the first physical address.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

FIG. 7 is a flowchart of an example method 700 associated with exception list compression for L2P tables. In some implementations, a memory apparatus (e.g., the memory system 110 and/or the memory system controller 115) may perform or may be configured to perform the method 700. In some implementations, another device or a group of devices separate from or including the memory apparatus (e.g., the host system 105 and/or the host processor 145) may perform or may be configured to perform the method 700. Additionally, or alternatively, one or more components of the memory apparatus (e.g., one or more memory devices 120 and/or one or more local controllers 125) may perform or may be configured to perform the method 700. Thus, means for performing the method 700 may include the memory apparatus and/or one or more components of the memory apparatus. Additionally, or alternatively, a non-transitory computer-readable medium may store one or more instructions that, when executed by the memory apparatus, cause the memory apparatus to perform the method 700.

As shown in FIG. 7, the method 700 may include compressing a physical page table associated with an L2P table, to obtain a compressed version of the physical page table, wherein the physical page table is associated with LBA and physical address pairs, wherein the compressed version is associated with a set of groups of LBAs and an exception list, and wherein the compressed version includes an indication of physical addresses associated with respective starting LBAs included in the set of groups and includes sequentiality indications for respective groups from the set of groups (block 710). As further shown in FIG. 7, the method 700 may include receiving, from a host system, a command indicating an LBA that is associated with the physical page table (block 720). As further shown in FIG. 7, the method 700 may include performing a lookup operation using the compressed version of the physical page table to identify a physical address associated with the LBA (block 730). As further shown in FIG. 7, the method 700 may include performing, based on the command, an action associated with the physical address (block 740).

The method 700 may include additional aspects, such as any single aspect or any combination of aspects described below and/or described in connection with one or more other methods or operations described elsewhere herein.

In a first aspect, a sequentiality indication indicates whether LBAs included in a group, from the set of groups, are associated with sequential physical addresses with respect to a first physical address associated with a first LBA included in the group.

In a second aspect, alone or in combination with the first aspect, the exception list indicates physical addresses for respective LBAs that are not associated with sequential physical addresses.

In a third aspect, alone or in combination with one or more of the first and second aspects, compressing the physical page table comprises identifying, for each group from the set of groups, the physical addresses associated with the respective starting LBAs, identifying, for each LBA included in each group from the set of groups, whether each LBA is associated with sequential physical addresses with respect to the physical addresses associated with respective starting LBAs, and selectively setting bits, associated with respective LBAs, included in the sequentiality indications based on whether each LBA is associated with sequential physical addresses with respect to the physical addresses of the respective starting LBAs.

In a fourth aspect, alone or in combination with one or more of the first through third aspects, selectively setting bits included in the sequentiality indications comprises setting a bit associated with the LBA to indicate that the LBA is not associated with a sequential physical address, incrementing a counter associated with a position associated with the bit in a sequentiality indication based on setting the bit to indicate that the LBA is not associated with the sequential physical address, and adding the physical address associated with the LBA to an entry of the exception list.

In a fifth aspect, alone or in combination with one or more of the first through fourth aspects, the method 700 includes decompressing the physical page table based on identifying physical addresses of respective LBAs following a logical order of the respective LBAs based on iterating the physical addresses associated with the respective starting LBAs included in the set of groups or based on information included in an entry included in the exception list.

In a sixth aspect, alone or in combination with one or more of the first through fifth aspects, the compressed version includes exception list offsets for respective groups from the set of groups, and the exception list offsets indicate starting locations in the exception list associated with the respective groups.

In a seventh aspect, alone or in combination with one or more of the first through sixth aspects, performing the lookup operation comprises identifying a sequentiality indication associated with a group associated with the LBA, identifying, based on a bit, included in the sequentiality indication, that is associated with the LBA, whether the LBA is associated with a sequential physical address with respect to a starting LBA associated with the group, and identifying, based on whether the LBA is associated with the sequential physical address, the physical address associated with the LBA, based on incrementing a physical address associated with the starting LBA or based on an entry included in the exception list.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

FIG. 8 is a flowchart of an example method 800 associated with exception list compression for L2P tables. In some implementations, a memory apparatus (e.g., the memory system 110 and/or the memory system controller 115) may perform or may be configured to perform the method 800. In some implementations, another device or a group of devices separate from or including the memory apparatus (e.g., the host system 105 and/or the host processor 145) may perform or may be configured to perform the method 800. Additionally, or alternatively, one or more components of the memory apparatus (e.g., one or more memory devices 120 and/or one or more local controllers 125) may perform or may be configured to perform the method 800. Thus, means for performing the method 800 may include the memory apparatus and/or one or more components of the memory apparatus. Additionally, or alternatively, a non-transitory computer-readable medium may store one or more instructions that, when executed by the memory apparatus, cause the memory apparatus to perform the method 800.

As shown in FIG. 8, the method 800 may include receiving, from a host system, a command indicating an LBA that is associated with a physical page table associated with an L2P table (block 810). As further shown in FIG. 8, the method 800 may include performing a lookup operation associated with a compressed version of the physical page table to identify a physical address in the non-volatile memory associated with the LBA, wherein the compressed version is associated with an exception list that indicates physical addresses for respective LBAs that are associated with non-sequential physical addresses (block 820). As further shown in FIG. 8, the method 800 may include performing, based on the command, an action associated with the physical address (block 830).

The method 800 may include additional aspects, such as any single aspect or any combination of aspects described below and/or described in connection with one or more other methods or operations described elsewhere herein.

In a first aspect, the method 800 includes determining that an update is to be made to the physical page table, decompressing, based on determining that the update is to be made, the compressed version of the physical page table, and performing the update to the physical page table.

In a second aspect, alone or in combination with the first aspect, the compressed version of the physical page table is associated with a set of groups of LBAs, and the compressed version includes sequentiality bitmaps associated with respective groups of LBAs from the set of groups of LBAs and physical addresses in the non-volatile memory associated with starting LBAs associated with the respective groups of LBAs.

In a third aspect, alone or in combination with one or more of the first and second aspects, the sequentiality bitmaps include bits associated with respective LBAs, and the bits indicate whether the respective LBAs are associated with sequential physical addresses with respect to the physical addresses associated with the starting LBAs.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

In some implementations, a memory apparatus includes one or more controllers configured to: compress a set of entries associated with a logical-to-physical (L2P) table using an exception list compression technique, wherein the set of entries are associated with logical block address (LBA) and physical address pairs, and wherein the exception list compression technique is associated with an exception list that indicates one or more physical addresses for one or more LBAs that are associated with a non-sequential physical address; cause, based on compressing the set of entries, a compressed version of the set of entries to be cached in a volatile memory of the memory apparatus; receive, from a host system, a command indicating an LBA that is associated with the set of entries; and perform a lookup operation using the compressed version of the set of entries to identify a physical address associated with the LBA.

In some implementations, a method includes compressing, by a memory apparatus, a physical page table associated with a logical-to-physical (L2P) table, to obtain a compressed version of the physical page table, wherein the physical page table is associated with logical block address (LBA) and physical address pairs, wherein the compressed version is associated with a set of groups of LBAs and an exception list, and wherein the compressed version includes an indication of physical addresses associated with respective starting LBAs included in the set of groups and includes sequentiality indications for respective groups from the set of groups; receiving, by the memory apparatus and from a host system, a command indicating an LBA that is associated with the physical page table; performing, by the memory apparatus, a lookup operation using the compressed version of the physical page table to identify a physical address associated with the LBA; and performing, by the memory apparatus and based on the command, an action associated with the physical address.

In some implementations, an apparatus includes non-volatile memory; and a controller configured to execute instructions that cause the apparatus to: receive, from a host system, a command indicating a logical block address (LBA) that is associated with a physical page table associated with a logical-to-physical (L2P) table; perform a lookup operation associated with a compressed version of the physical page table to identify a physical address in the non-volatile memory associated with the LBA, wherein the compressed version is associated with an exception list that indicates physical addresses for respective LBAs that are associated with non-sequential physical addresses; and perform, based on the command, an action associated with the physical address.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory apparatus, comprising:
one or more controllers configured to:
    compress a set of entries associated with a logical-to-physical (L2P) table using an exception list compression technique,
        wherein the set of entries are associated with logical block address (LBA) and physical address pairs, and
        wherein the exception list compression technique is associated with an exception list that indicates one or more physical addresses for one or more LBAs that are associated with a non-sequential physical address;
    cause, based on compressing the set of entries, a compressed version of the set of entries to be cached in a volatile memory of the memory apparatus;
    receive, from a host system, a command indicating an LBA that is associated with the set of entries; and
    perform a lookup operation using the compressed version of the set of entries to identify a physical address associated with the LBA.

2. The memory apparatus of claim 1,
wherein the one or more controllers, to compress the set
of entries, are configured to:
   form a set of groups of LBAs from LBAs associated
      with the set of entries,
      wherein a group of LBAs, from the set of groups,
         includes a set of consecutive LBAs,
      wherein the compressed version of the set of entries
         includes, for the group of LBAs, an indication of
         a physical address associated with a first LBA
         included in the group and indications of whether
         other LBAs included in the group of LBAs are
         associated with sequential physical addresses with
         respect to the physical address associated with the
         first LBA, and
      wherein the exception list includes physical
         addresses for any LBAs included in the group that
         are not associated with sequential physical
         addresses with respect to the physical address
         associated with the first LBA.
3. The memory apparatus of claim 2,
wherein the indications of whether other LBAs included
in the group are associated with sequential physical
addresses include a bitmap.
4. The memory apparatus of claim 1,
wherein the compressed version of the set of entries is
associated with a set of groups of LBAs from LBAs
associated with the set of entries, wherein each group
includes a set of logically sequential LBAs, and
wherein each group, from the set of groups, includes:
   an indication of a non-volatile memory physical
      address associated with a first LBA, and
   a bitmap indicating whether other LBAs are associated
      with sequential non-volatile memory physical
      addresses with respect to the non-volatile memory
      physical address associated with the first LBA.
5. The memory apparatus of claim 4,
wherein each group, from the set of groups, includes:
   an exception list offset indicating a starting location in
      the exception list for LBAs included in that group.
6. The memory apparatus of claim 4,
wherein each group, from the set of groups, includes:
   one or more indications of a quantity of LBAs, from the
      set of logically sequential LBAs, that are not asso-
      ciated with sequential non-volatile memory physical
      addresses with respect to the non-volatile memory
      physical address associated with the first LBA.
7. The memory apparatus of claim 1,
wherein the one or more controllers, to perform the
lookup operation, are configured to:
   identify a group of LBAs, from a set of groups of LBAs
      associated with the compressed version, associated
      with the LBA;
   identify, based on an indication associated with the
      LBA included in a bitmap associated with the group,
      whether the LBA is associated with a sequential
      physical address with respect to a first physical
      address of a first LBA included in the group; and
   identify the physical address associated with the LBA
      based on whether the LBA is associated with the
      sequential physical address with respect to a first
      physical address.
8. The memory apparatus of claim 7,
wherein the one or more controllers, to identify the
physical address associated with the LBA, are config-
ured to:

identify the physical address based on incrementing the
      first physical address if the LBA is associated with
      the sequential physical address with respect to the
      first physical address; or
   identify the physical address from an entry, associated
      with the LBA, included in the exception list if the
      LBA is not associated with the sequential physical
      address with respect to the first physical address.
9. A method, comprising:
compressing, by a memory apparatus, a physical page
   table associated with a logical-to-physical (L2P) table,
   to obtain a compressed version of the physical page
   table,
   wherein the physical page table is associated with
      logical block address (LBA) and physical address
      pairs,
   wherein the compressed version is associated with a set
      of groups of LBAs and an exception list, and
   wherein the compressed version includes an indication
      of physical addresses associated with respective
      starting LBAs included in the set of groups and
      includes sequentiality indications for respective
      groups from the set of groups;
receiving, by the memory apparatus and from a host
   system, a command indicating an LBA that is associ-
   ated with the physical page table;
performing, by the memory apparatus, a lookup operation
   using the compressed version of the physical page table
   to identify a physical address associated with the LBA;
   and
performing, by the memory apparatus and based on the
   command, an action associated with the physical
   address.
10. The method of claim 9,
wherein a sequentiality indication indicates whether
   LBAs included in a group, from the set of groups, are
   associated with sequential physical addresses with
   respect to a first physical address associated with a first
   LBA included in the group.
11. The method of claim 9,
wherein the exception list indicates physical addresses for
   respective LBAs that are not associated with sequential
   physical addresses.
12. The method of claim 9,
wherein compressing the physical page table comprises:
   identifying, for each group from the set of groups, the
      physical addresses associated with the respective
      starting LBAs;
   identifying, for each LBA included in each group from
      the set of groups, whether each LBA is associated
      with sequential physical addresses with respect to the
      physical addresses associated with respective start-
      ing LBAs; and
   selectively setting bits, associated with respective
      LBAs, included in the sequentiality indications
      based on whether each LBA is associated with
      sequential physical addresses with respect to the
      physical addresses of the respective starting LBAs.
13. The method of claim 12,
wherein selectively setting bits included in the sequenti-
   ality indications comprises:
   setting a bit associated with the LBA to indicate that the
      LBA is not associated with a sequential physical
      address;
   incrementing a counter associated with a position asso-
      ciated with the bit in a sequentiality indication based on setting the bit to indicate that the LBA is not associated with the sequential physical address; and adding the physical address associated with the LBA to an entry of the exception list.

14. The method of claim 9, further comprising:

decompressing the physical page table based on identifying physical addresses of respective LBAs following a logical order of the respective LBAs based on iterating the physical addresses associated with the respective starting LBAs included in the set of groups or based on information included in an entry included in the exception list.

15. The method of claim 9, wherein the compressed version includes exception list offsets for respective groups from the set of groups, and wherein the exception list offsets indicate starting locations in the exception list associated with the respective groups.

16. The method of claim 9, wherein performing the lookup operation comprises:

identifying a sequentiality indication associated with a group associated with the LBA;

identifying, based on a bit, included in the sequentiality indication, that is associated with the LBA, whether the LBA is associated with a sequential physical address with respect to a starting LBA associated with the group; and identifying, based on whether the LBA is associated with the sequential physical address, the physical address associated with the LBA, based on incrementing a physical address associated with the starting LBA or based on an entry included in the exception list.

17. An apparatus, comprising:

non-volatile memory; and a controller configured to execute instructions that cause the apparatus to:

receive, from a host system, a command indicating a logical block address (LBA) that is associated with a physical page table associated with a logical-to-physical (L2P) table;

perform a lookup operation associated with a compressed version of the physical page table to identify a physical address in the non-volatile memory associated with the LBA, wherein the compressed version is associated with an exception list that indicates physical addresses for respective LBAs that are associated with non-sequential physical addresses; and perform, based on the command, an action associated with the physical address.

18. The apparatus of claim 17, wherein the instructions, when executed by the controller, are further configured to cause the apparatus to:

determine that an update is to be made to the physical page table;

decompress, based on determining that the update is to be made, the compressed version of the physical page table; and perform the update to the physical page table.

19. The apparatus of claim 17, wherein the compressed version of the physical page table is associated with a set of groups of LBAs, and wherein the compressed version includes sequentiality bitmaps associated with respective groups of LBAs from the set of groups of LBAs and physical addresses in the non-volatile memory associated with starting LBAs associated with the respective groups of LBAs.

20. The apparatus of claim 19, wherein the sequentiality bitmaps include bits associated with respective LBAs, and wherein the bits indicate whether the respective LBAs are associated with sequential physical addresses with respect to the physical addresses associated with the starting LBAs.

* * * * *